United States Patent Office 2,801,816
Patented Aug. 6, 1957

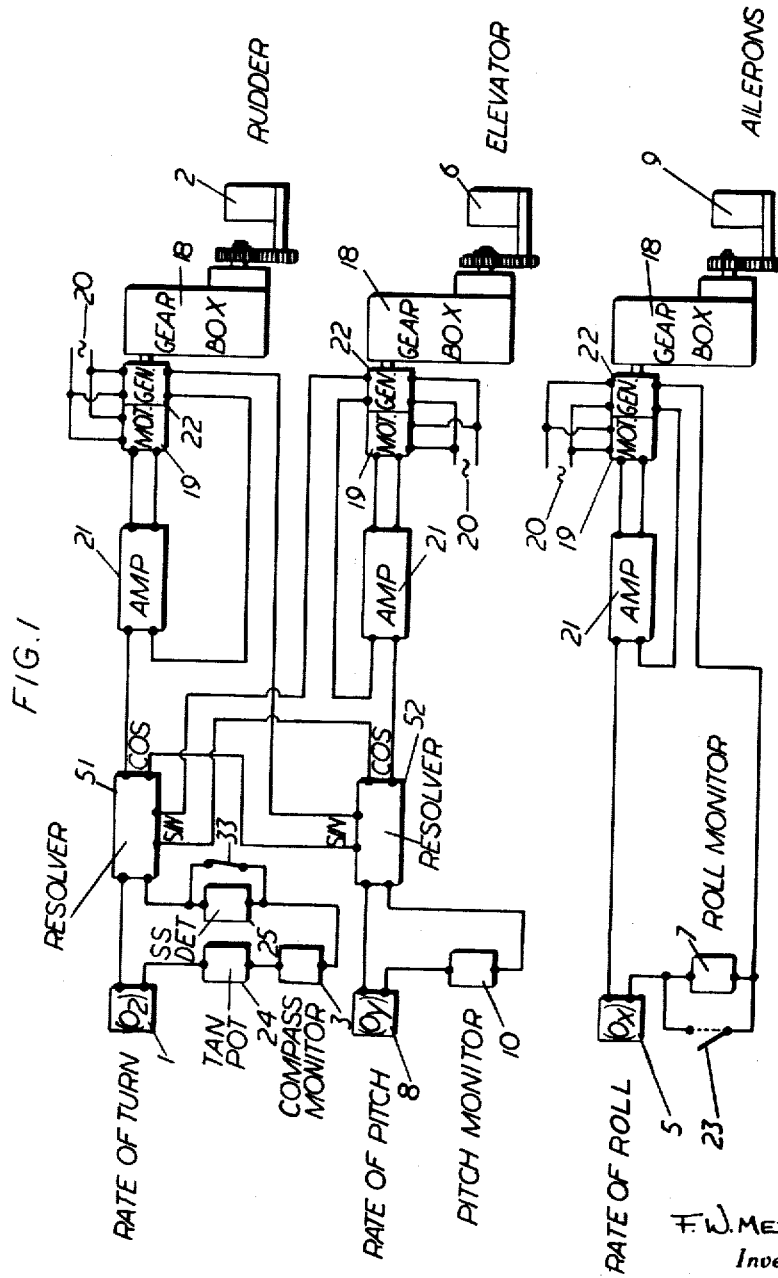

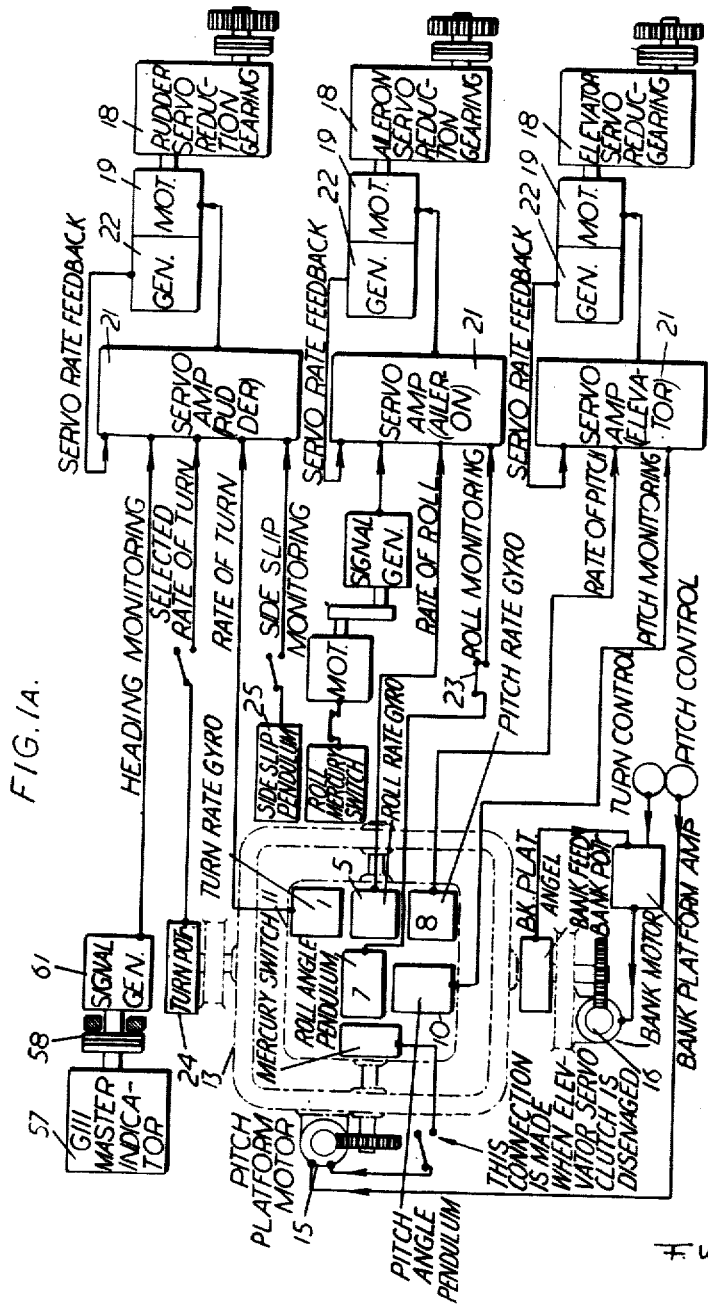

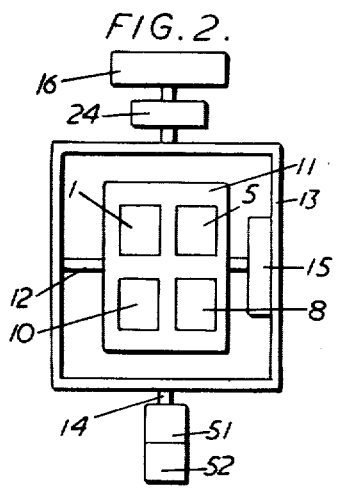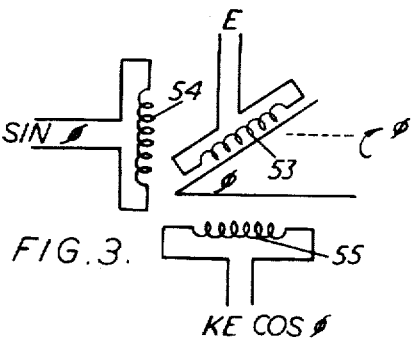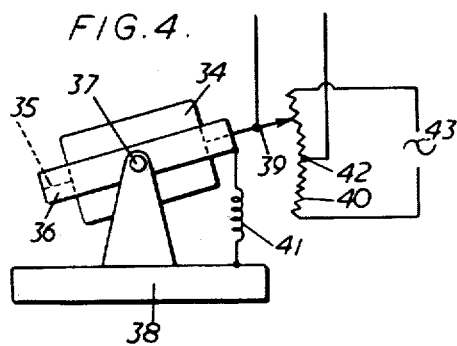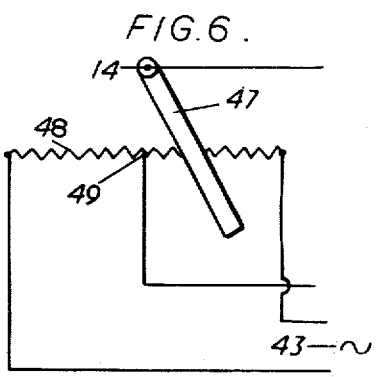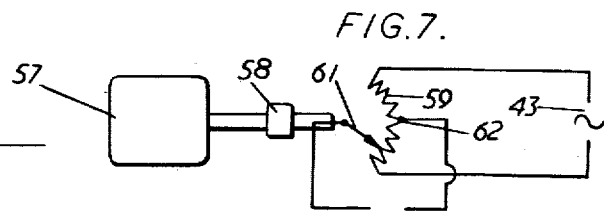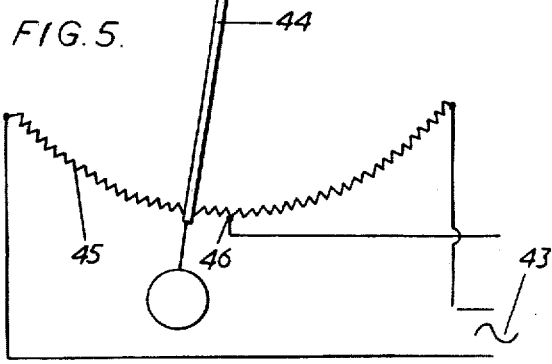
F. W. Meredith
Inventor

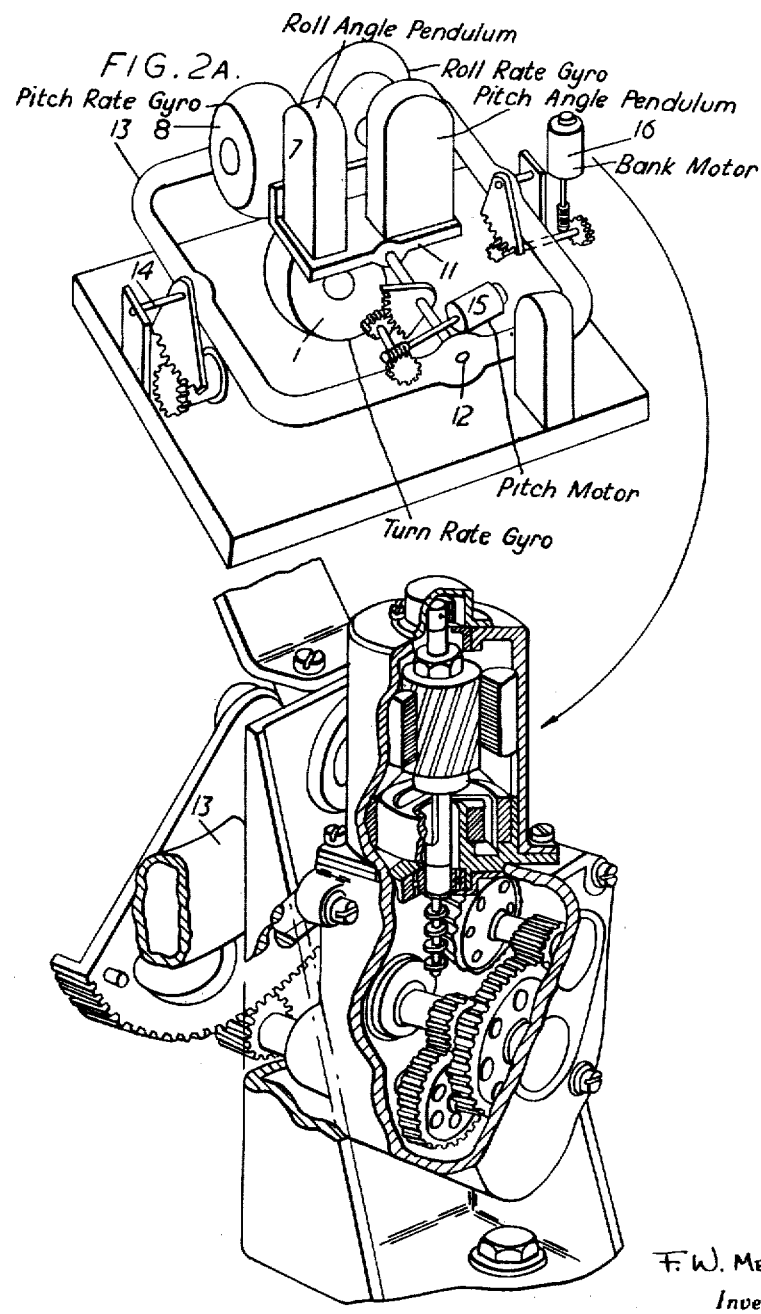

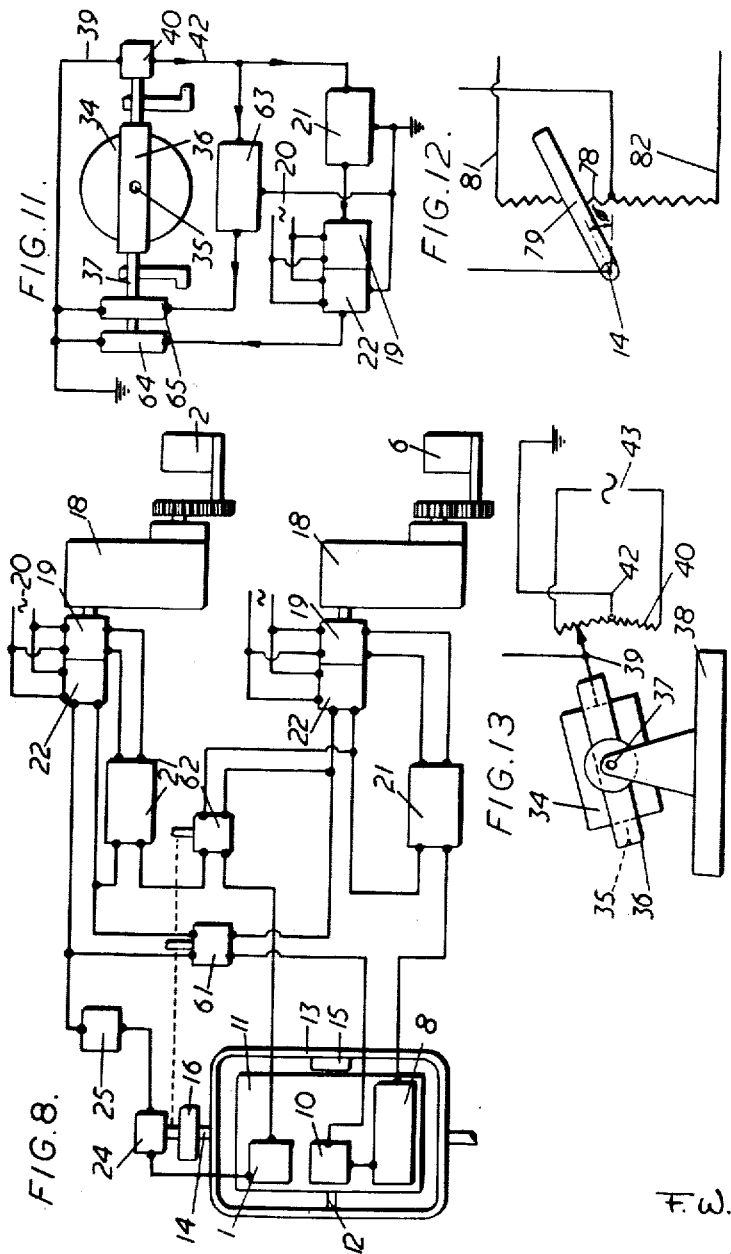

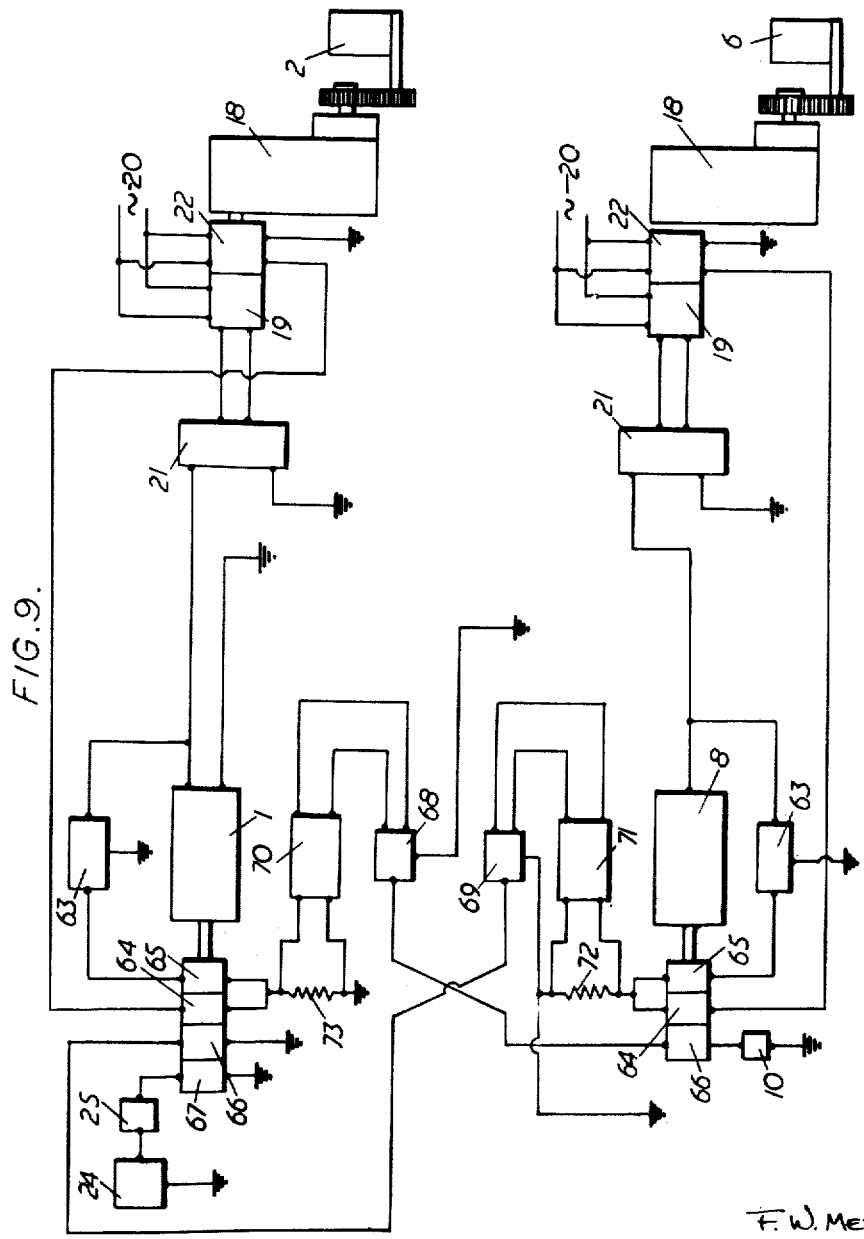

2,801,816

AUTOMATIC CONTROL SYSTEMS FOR AIRCRAFT

Frederick William Meredith, Cheltenham, England

Continuation of application Serial No. 53,935, October 11, 1948. This application August 3, 1955, Serial No. 526,153

Claims priority, application Great Britain October 10, 1947

30 Claims. (Cl. 244—77)

This invention relates to automatic control systems for aircraft and is particularly concerned with the provision of means for changing course by means of banked turns.

In stabilizing or control systems such as the present, whenever a deviation in yaw is detected the craft must be turned about an azimuth angle regardless of its attitude. When an aircraft is banked both rudder and elevator must be applied to obtain the proper components of turn.

The present application is a continuation of application Serial No. 53,935 filed October 11, 1948, and is related to application Serial No. 523,339 filed the 21st day of February, 1944, for Control of Aircraft etc., now abandoned, and is intended to clarify the teaching thereof, set forth in greater detail the inventive concepts contained therein and to comply fully with the statutory requirements regarding disclosure of the invention.

It is an object of the invention to utilize rate of turn means as a control.

It is an object of the invention to provide a control system in which a servomotor is caused to turn at a rate proportional to a measured rate of turn.

It is an object of the invention to apply as input to an amplifier a voltage proportional to the measured rate of turn and feed back to the amplifier input a negative value proportional to a controlled servomotor speed.

It is an object of the invention to navigate a movable craft automatically by providing means which determine the necessary adjustments about a plurality of axes and which apply the several required corrections to those control surfaces of the craft which affect the attitude of the craft with respect to the several axes concerned.

It is an object of the invention to navigate a movable craft automatically by providing means effectively to resolve the required correction in attitude of a movable craft about the several axes of a system of reference and to apply the several components of correction determined by such vector resolution to the corresponding control surfaces of the craft to maintain a desired course.

It is an object of the invention to provide means to accomplish what may be termed a rate/rate control in which rate of change or rate of deviation of a variable is measured.

It is an object of the invention to provide means for changing the datum at a predetermined rate by injecting a fixed signal as in azimuth control or by rotating a rate of turn gyroscope about a control axis as in pitch and roll controls.

It is an object of the invention to provide a rate/rate control in which course can be changed at a predetermined rate merely by injecting a constant signal. This reduces or eliminates side slip by correctly relating the rate of turn and the angle of bank for a given air speed. Another advantage of the invention is the great reduction in or elimination of any tendency to hunt.

Reference is made to Smith's Controlled Flight System published September 1948 by Smiths Aircraft Instruments Ltd., of London, England. This publication discloses and describes in detail an electric pilot system upon which certain of the improvements herein are made.

Reference is also made for background to the following U. S. Patent Nos. 23,664; 2,503,346; 2,514,250; 2,537,884; 2,546,555; 2,607,550; 2,619,623; 2,620,463; 2,621,003; 2,649,563; 2,649,564; 2,650,338; 2,651,015; and 2,710,729.

Normally an aircraft is controlled about three axes, namely, the roll axis or longitudinal axis of the aircraft, the pitch axis or transverse axis of the aircraft and the yaw axis which is mutually perpendicular to the other two axes and may be thought of as the vertical axis. These axes are fixed in the aircraft and to distinguish them from the corresponding axes fixed relatively to the earth's gravitational field they will be referred to as "aircraft axes," the latter being referred to as "gravity axes." During straight flight the gravity axes and the aircraft axes are coincident and it matters not whether the means for detecting the components of turn requiring respectively correcting movements of the rudder and elevators' detect about the gravity axes or the aircraft axes.

During steeply banked turns, however, serious difficulties arise. In the extreme case of a ninety degree bank the aircraft yaw axis rotates through an angle of ninety degrees and coincides with the gravity pitch axis while the aircraft pitch axis coincides with the gravity yaw axis. Systems in which the turn detectors detect turns about the gravity axes suffer from delay of the correcting control movement since the immediate correction is not about the same axis as the deviation requiring correction. Thus, in such a system, during a ninety degree bank a disturbance about the gravity pitch axis will result in operation of the elevators to effect rotation of the aircraft about the gravity yaw axis and so give rise to an operation of the rudder, with considerable lag, to correct the initial disturbance. On the other hand, systems in which the turn detectors detect turns about the aircraft axes result in the nose of the aircraft dropping when a required rate of turn is imposed on the yaw control.

The invention is directed towards overcoming these difficulties, and for this purpose utilizes the fact that any rates of turn or small displacements in angle about the gravity yaw, pitch and roll axes may be replaced by their components about the aircraft yaw, pitch and roll axes, by the well known rules for the resolution and composition of vector quantities.

Hence, according to the invention, an automatic control system for aircraft comprises bank-setting means, means for detecting the deviation of the rate of turn of the aircraft about the gravity yaw axis from a predetermined value, and means for controlling the rudder and elevators simultaneously in accordance with the angle of bank and detected deviation whereby the rate of turn of the aircraft about the gravity yaw axis is maintained substantially at the predetermined value. Such means may be provided by means for obtaining the components about the aircraft axes of the detected deviation about the gravity axes. Such means may also be provided by cross-feed means which ensure that the ratio of elevator to rudder movements which are called into play to maintain the turn is substantially in accordance with the tangent of the angle bank. Means for obtaining the components of the detected deviation or cross-feed means may be conveniently operated by the said bank-setting means. Reference is made to United States application Serial No. 655,684, now United States Patent No. 2,607,550, which concerns related problems in automatic pilots.

When the aircraft changes course by means of a level banked turn, the aircraft yaw and pitch axes incline to the gravity yaw and pitch axes by the angle of bank and the rate of turn about the gravity yaw axis must be proportional to the tangent of the angle of bank if sideslip is to be avoided, the necessary factor of proportionality being determined by the forward air speed. Thus, according to a further feature of the invention, course setting means are provided which cause the rudder and elevators to be operated in such a way that the rate of turn of the aircraft about the gravity yaw axis is proportional to the tangent of the angle of bank. Such course-setting means may conveniently be operated by the aforementioned bank-setting means. The constant of proportionality of the said course setting means may be initially adjusted to that value which eliminates side slip at the normal cruising speed of the aircraft.

There will frequently be some variation of the speed of the aircraft from its normal cruising value, or some error may be present in the means for the automatic (or manual) adjustment of the above mentioned constant of proportionality if provision is made for such adjustment during flight. In such cases side-slip will tend to take place during a banked turn. In accordance with a further feature of the invention a side-slip detector is therefore provided which, if side-slip tends to occur during a banked turn, will actuate means operating the rudder and elevators in conjunction to alter the rate of turn in such a way as to counteract side-slip. Such means are conveniently provided by the means for obtaining the components of the detected deviation and controlling means mentioned above.

In accordance with another feature of the invention further means are provided to obviate any tendency of the nose of the aircraft to rise or fall during a banked turn. Such means may conveniently be provided by an instrument detecting rate of turn of the aircraft about the gravity pitch axis together with a monitor detecting angle of rotation of the aircraft about the gravity pitch axis. Additional means are provided by which these controls actuate the elevators and rudder simultaneously so as to maintain the plane of flight of the aircraft level during a banked turn. Such means are conveniently provided either by the aforementioned means for obtaining the components of the detected deviation or cross-feed means which ensure that the ratio of rudder to elevator movements which are brought into play by the means detecting turn in pitch is substantially in accordance with the tangent of the angle of bank.

Constructions in accordance with the invention in which the invention is applied to an automatic control system for aircraft having provision for changing course by means of banked turns will now be described by way of example, reference being made to the accompanying drawings, in which:

Figure 1 is a diagrammatic showing of an automatic control system for controlling an aircraft about all three axes and incorporating the invention.

Figure 1A is a diagrammatic showing of an automatic control system for controlling an aircraft about all three axes according to applicant's inventions, but without vector resolution.

Figure 2 is a schematic plan view of a gyro platform unit incorporating selected control elements of Figure 1.

Figure 2A is an enlarged group detail in perspective of the gyro platform unit of Figure 2.

Figure 3 is a further detailed diagrammatic showing of the resolver units shown at 51, 52 in Figure 1.

Figure 4 is a side elevation of one form of gyro unit forming part of the device and comprising a possible construction of the rate of turn instruments shown at 1, 5 and 8 in Figure 1.

Figure 5 is a diagrammatic elevation of a pendulum suitable for use as any one of the devices shown at 7, 10 and 25 in Figure 1 together with circuit connections.

Figure 6 is a diagrammatic plan view of one form of the tangent potentiometer shown at 24 in Figure 2.

Figure 7 is a diagrammatic plan view of one form of compass monitor indicated at 3 in Figure 1.

Figure 8 shows an alternative system to that shown in Figure 1, the control of the rudder and elevator only being illustrated.

Figure 9 illustrates diagrammatically a further form of aircraft control system.

Figure 10:
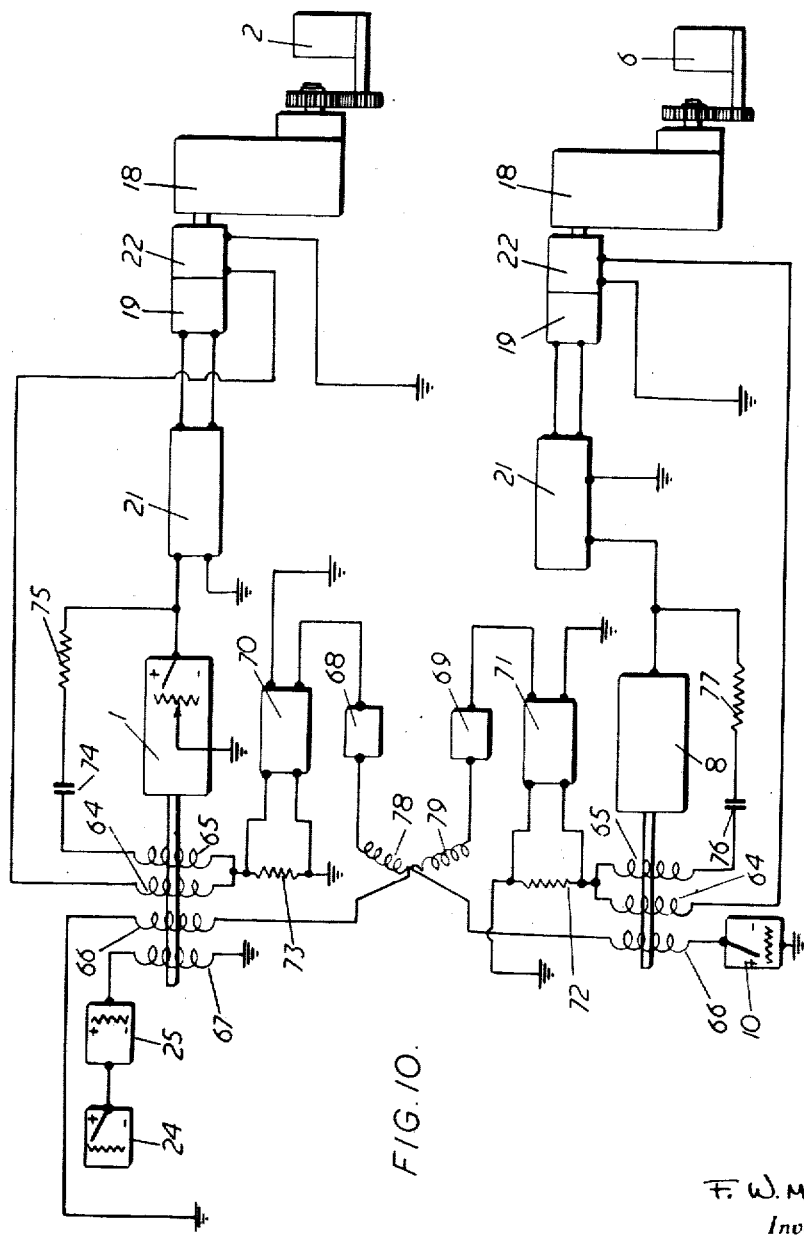

Figure 10 illustrates a D. C. version of the A. C. system shown in Figure 9.

Figure 11 illustrates a simplified form of the control circuit for one of the aircraft control surfaces shown in Figure 9.

Figure 12 shows in more detail the tangent potentiometers 61 and 62 of Figure 8 and 68 and 69 of Figures 9 and 10; and Figure 13 shows in more detail the gyroscopes of Figures 9 and 10.

The aircraft is stabilized about three mutually perpendicular axes by the three rate of turn gyroscopes 1, 5 and 8 which are mounted on the platform 11 shown in Figure 2. The platform 11, is gimballed in the aircraft about the mutually perpendicular axes 12, 14 in pitch and roll respectively and can be rotated about these axes by motors and suitable gearing, shown symbolically by 15 and 16, which are under the control of the pilot. Rate of turn or yaw gyro 1 produces a signal proportional to the rate of turn in space of the platform 11 about an axis normal to itself, and rate of pitch gyro 8 produces a signal proportional to the rate of turn of the platform 11 in space about the axis 12 and rate of roll gyro 5 produces a signal proportional to the rate of turn of the platform in space about the axis perpendicular to the plane of the two first named axes. A pendulum 10 normally gives a signal proportional to the angle of pitch of the platform 11 in space about the axis 12. Axis 14 is fixed in a fore and aft direction in the aircraft and in conditions of level flight axes 12 and 14 are level both in the aircraft and in space and in such conditions the gravity and aircraft axes coincide. In other flight conditions axis 14 is the aircraft pitch axis and it will be shown below that the platform 11 is maintained level in space, so axis 12 is the gravity pitch axis, an axis perpendicular to 12 in the plane of platform 11 is the gravity roll axis and an axis normal to the plane of platform 11 is the gravity yaw axis. A potentiometer 24 produces a signal proportional to the tangent of the angle through which the gimbal ring 13 has been turned relative to the aircraft, the constant of proportionality being determined in accordance with the normal cruising speed of the aircraft. A pendulum 25 mounted on the aircraft with its axis of oscillation normally parallel to the aircraft roll axis 14, so as to give a signal proportional to the amount of side-slip when aircraft is turning, is similar to pendulum 10 which has its oscillatory axis normally parallel to the aircraft pitch axis 12. A pendulum 7, similar to pendulums 10 and 25, is arranged to give a signal proportional to the angle of roll in straight flight conditions and is mounted with its axis of rotation parallel to the aircraft roll axis 14.

A compass monitor giving a signal proportional to the deviation of the aircraft from a predetermined course is shown at 3. It may conveniently be of the kind shown and described in U. S. Patent No. 2,649,564 and consist of a potentiometer whose slider is connected through a solenoid-operated clutch, closed in straight flight, to a compass repeater. During a turn the solenoid is energized and the clutch is opened so that the slider does not follow the repeater. At the conclusion of the turn the clutch is closed, so that the compass monitor 3 then gives a monitor signal to retain the heading of the craft in the direction reached at the conclusion of the turn. Such a device is shown in Figure 7 and its operation is discussed at length in the above-mentioned patent. Switch 33, connected across the output of side-slip detector 25, is closed and switch 23, connected across the output of roll monitor 7, is open during conditions of normal straight flight; during a banked turn switch 33 is open and switch 23 is closed. The shunting action of switches 23 and 33 effectively removes side-slip detector 25 and roll monitor 7 from their respective circuits in an electrical or control sense, preventing any signal voltage from being developed between their output terminals. However, the switching action may be arranged to remove these elements completely from the circuit during a turn by a physical disconnect if desired, e. g., switches 23 and 33 could be double pole, double throw. Vector quantity resolver elements 51 and 52 which are more fully described below have rotors geared to shaft 14 of platform 11 and stators fixed in the aircraft. If the angle through which platform 11 has been turned relative to the aircraft about axis 14 is $\phi$ and the input to a resolver is E, the two outputs from the resolver will be K. E. sin $\phi$ and K. E. cos $\phi$ where K is a constant depending on the resolver, but substantially the same for each of the resolvers 51 and 52.

The amplifiers 21 supply the motors 19 which may conveniently be of the hysteresis type described in British patent specifications No. 576,248 and No. 576,249 which operate the rudder 2, elevators 6 and ailerons 9 through gearboxes 18. Each motor has mounted on its shaft a generator 22 of any convenient tachometric type which produces a signal proportional to the rate of rotation of the motor 19 in opposition to the other signals in the amplifier input circuit. The input to the rudder amplifier consists of the sum of one of the outputs of resolver 51, one of the outputs of resolver 52 and the output of the generator 22 mounted on the rudder servo motor shaft. As the gain of the amplifier is high the motor 19 will run at such speed that the input to the amplifier 21 is reduced substantially to zero. In order to supply power to the motor 19 to cause it to run, the amplifier 21 must have some input applied to it. As part of the input to amplifier 21 is supplied by the generator 22 which is driven by motor 19, the amplifier input depends in a measure on the motor speed. The higher the gain the smaller the requisite input will be to supply power to motor 19. By making the gain high the necessary input can be made substantially zero, so that the motor will run at a speed substantially proportional to the sum of the signals, other than that from generator 22, at the amplifier input. The input to the elevator amplifier is somewhat similar, being obtained from the sum of the other outputs of resolvers 51 and 52 in series with the output from the elevator generator 22. The input to the aileron servo motor consists of the signal from the rate of turn gyro 5 and the roll monitor 7, in series with the signal from the aileron generator 22.

In the above, all the signals referred to are A. C. signals of the same frequency as, and in quadrature with, the voltage from an A. C. source of constant voltage, 20, leading or lagging this voltage according to the sign of the quantity to which the voltage is proportional. The source 20 supplies one of the inputs to each of the motors 19 (which are two-phase motors) and those to the generators 22. The manner in which this control system functions will now be described.

If the angle through which the platform has been turned relative to the aircraft about aircraft roll axis 14 is $\phi$, the output from the resolver 51 supplied to the rudder circuit is proportional to cos $\phi$, and the output of resolver 52 into the elevator circuit is also proportional to cos $\phi$. Similarly the output from resolver 51 into the elevator circuit and the output from the resolver 52 into the rudder circuit are proportional to sin $\phi$. In straight and level flight the platform 11 is level in the aircraft, i. e. $\phi$ is zero, so that the outputs of both 51 into the elevator circuit and 52 into the rudder circuit are zero.

The operation of the aileron control will first be considered. Suppose the aircraft is disturbed in roll. A signal will be produced by the rate of roll gyro 5 causing the motor to run and operate the ailerons and generator at such a speed as to reduce the amplifier input practically to zero, so rapidly stabilizing the aircraft in roll. If, after the disturbance is stabilized in roll, the aircraft is not level, the signal from the pendulum 7 will maintain a slow rate of roll until it is level and the pendulum signal is zero.

The operation of the elevator and rudder controls is similar, the resolvers producing effectively a "straight through" connection between rate of turn gyro 1 and the components in series with it and the rudder amplifier 21 and rate of turn gyro 8 and the elevator amplifier 21 respectively, the tangent potentiometer 24 producing zero output (as $\phi=0$). It will be noted that in the drawing like parts are referred to by the same numerals. Thus, the amplifiers for the rudder, elevator and ailerons are all named 21 as they are of identical construction and operation. The same is true of the motor 19, generator 22 and gearboxes 18. The rates of turn gyros 1, 5 and 8 although of the same essential construction, are differently positioned and the description of their respective functions is facilitated by the use of different numbers. The side-slip detector 25 is shorted out in level flight. The effect of the control, it can be seen, is thus to maintain platform 11 level in space and the heading of the aircraft fixed. When it is desired to change the attitude of the aircraft in pitch, pitch motor 15 is operated under the control of the pilot to rotate platform 11 in pitch through the angle by which it is desired to change the pitch attitude of the aircraft with respect to the gravity axes. The signal from rate of turn gyro 8 causes the elevator servo motor 19 to run and tend to maintain the platform 11 level in space. When the motor 15 is stopped, if the platform 11 is not quite level, the signal from the monitor 10 will maintain a slow rate of pitch until the platform is level in space.

It can be seen that so far the effect of the control is to maintain the platform 11 level in space. When it is desired to effect a change of course by means of a banked turn, switch 23 is closed and switch 33 opened and the signals from the compass monitor 3 and roll monitor 7 are eliminated; the monitor 3 by the disconnection of its slider by the solenoid operated clutch discussed above and the monitor 7 by being shunted. The platform 11 is rotated relative to the aircraft by operation of motor and gearing 16 through the angle of bank $\phi$ required. The signal from the rate of turn gyro 5 causes the servo motor 19 to operate the ailerons 9 and maintain the platform 11 level in space, i. e. the craft is banked through an angle equal and opposite to that through which the platform 11 has been rotated relative to the aircraft. If the signal from monitor 3 were left in the circuit on change of course it would tend to keep the aircraft on course while the signal from tangent potentiometer 24 would be demanding a change. It follows that to cause the craft to make a properly banked turn the signals from the monitors 3 and 7 must be eliminated while the turn is being executed. Now it is necessary to control the elevators 6 in accordance with the quantity $$q=(c \sin \phi + b \cos \phi)$$

and the rudder 2 in accordance with the quantity $$r=(c \cos \phi - b \sin \phi)$$

where $b$ is the rate of turn about the gravity pitch axis and $c$ is the deviation of the rate of turn about the gravity yaw axis from the value for which the aircraft will turn without side-slipping at the angle of bank $\phi$ and the cruising speed of the aircraft, the quantities $q$, $r$ being the rate of turn about the aircraft pitch and yaw axes respectively. The aileron servo 19 has maintained the platform 11 level, so that the platform axes and the gravity or space axes still coincide. The resolvers 51 and 52 produce signals in the elevator and rudder circuits which are respectively proportional to these quantities.

Because of the rotation of the platform 11 the tangent potentiometer 24 now produces a signal proportional to tan $\phi$. The constant of proportionality is so chosen that this signal is equal in magnitude and opposite in sign to that produced by the rate of turn gyro 1 when the aircraft is turning at the correct rate (i. e. without side-slip) for angle of bank $\phi$ and the normal crusing speed of the aircraft. This signal, as resolved by the resolvers 51, and 52, will cause the rudder and elevator servo motors 19 to run so as to reduce the input to the corresponding amplifiers to zero, i. e. the rudder and elevators will be operated jointly in such a way that the resultant input to the resolver 51 is zero, which implies that the signals from rate of turn gyro 1 and tangent potentiometer 24 are equal in magnitude and opposite in sign, so that the aircraft will be turning at the correct rate for its normal cruising speed. However, if the aircraft speed varies from its normal cruising speed, side-slip will tend to take place. The signal from the side-slip detector 25 will then operate the rudder and elevators so as to vary the rate of turn in such a way as to reduce the side-slip. By this means compensation is obtained for variations of the forward speed of the aircraft from its normal cruising speed. If the nose of the aircraft tends to rise or fall during the turn, the signals from the rate of turn gyro 8 and the pitch monitor 10 as resolved by 52 will cause the rudder and elevators to be operated to correct this tendency, in a similar way to that in which the elevators alone are operated to maintain the aircraft level in straight flight.

When the aircraft has turned through the required angle in azimuth the platform 11 is returned to the level position in the aircraft, with switch 23 opened and switch 33 closed. The clutch between the tangent potentiometer 24 and the compass monitor 3 is reengaged so that the automatic control, acts as described earlier to maintain the aircraft in straight and level flight.

Possible constructions of the various signal devices mentioned above will now be described in further detail. They are all supplied with alternating current from the source 43 whose output is of the same frequency as that of the source 20 but in phase quadrature with it. It is to be understood that isolating transformers are to be inserted as may be necessary in coupling the outputs of various devices together in series.

The elements of a resolver unit suitable for use as resolver 51 or 52 are shown at Figure 3. As there shown, a resolver comprises two stator windings 54 and 55 with their electrical axes at right angles and a rotor winding 53 mounted upon a shaft at right angles to the plane of the electrical axes of 54 and 55, the shaft being geared to the platform 11 in such a way that the angle through which the rotor is turned with respect to winding 54 is equal to the angle through which platform 11 has been rotated in roll relative to the aircraft. Although for greater clarity two resolver units are shown in Figure 1, it will be readily understood that a single resolver having two field windings in quadrature and two rotor windings in quadrature may be used to serve the purpose of both 51 and 52.

A suitable rate of turn gyroscope for use as gyroscope 1, 5 or 8 is illustrated diagrammatically in Figure 4. As there shown a gyroscope comprises a rotor 34 mounted on a spin axis 35 in a gimbal ring 36 gimballed about an axis 37 on a fixed base 38. Carried by the gimbal ring 36 is a potentiometer contact 39 arranged to sweep across a fixed arcuate potentiometer resistance 40 as the ring rotates with respect to the base about the axis 37. The ring 36 is restrained by a spring 41 to a central position in which the contact 39 engages the mid-point 42 of the resistance 40. The resistance 40 is connected across the A. C. source 43. The electrical output of the gyroscope appears between the contact 39 and the mid-point 42. In operation, any turn about an axis normal to the base 38 results in precession of the gyroscope about the axis 37 against the spring restraint to an extent determined by the rate of turn. Hence, the output voltage will be proportional to the rate of turn. It will be appreciated that the rate of turn gyroscope described above may be arranged to measure rate of turn about any of the three aircraft axes and that the three gyroscopes may readily be made interchangeable.

A pendulum suitable for use as pendulum 7, 10 or 25 is illustrated diagrammatically in Figure 5. As there shown, a pendulum having an arm 44 of suitable conducting material is pivoted to swing about an axis parallel to the roll axis in the case of pendulums 7 and 25 and parallel to the pitch axis in the case of pendulum 10. The arm 44 sweeps across an arcuate resistance 45 connected to the A. C. source 43, so that the electrical output appears between the arm 44 and the mid-point 46 of the resistance 45.

The tangent potentiometer 24 is illustrated diagrammatically in Figure 6. As there shown, an arm 47 of conducting material is attached to the axis 14 of platform 11 so as to rotate with the gimbal ring 13 and sweeps over a linear resistance 48 connected across the A. C. source 43. The output appearing between the arm 47 and the mid-point 49 of the resistance is thus proportional to the tangent of the angle through which the gimbal ring 13 is turned.

A suitable device for use as compass monitor 3 is shown at Figure 7. A compass repeater 57 (of any of the well known types) drives a conducting arm 61 sweeping over the arcuate resistance 59. The drive may be broken by solenoid-operated clutch 58 which is opened during a turn and closed during straight flight (as described earlier). Th resistance 59 is supplied from the A. C. source 43 and is center tapped at 62. The signal then obtained between the center tap 62 and the arm 61 is proportional to the deviation of the aircraft from its required heading.

An alternative form of the aircraft control system is shown in Figure 8. In this figure the rudder and elevator circuits only are shown, the aileron circuit being the same as in Figure 1. Similar components to those in Figure 1 are given the same reference numerals.

In this form of the invention, the resolver units 51 and 52 of Figure 1 are replaced by tangent potentiometers 61 and 62 which are illustrated in Figure 12. In this latter figure, the input is applied to input leads 81, 82 connected across a linear potentiometer resistance 78 having a center tapping 80. The slider arm 79 is mounted about an axis lying on a line through tapping 80 at right angles to resistance 78 and is attached or coupled to the axis 14 of the platform 11 so as to rotate with gimbal ring 13. The output, which is proportional to the product of tan $\phi$ and the input voltage, appears between slider arm 79 and tapping 80.

The input of tangent potentiometer 61 is connected across the output of yaw feedback generator 22 and the output therefrom applied in series with the outputs from pitch gyroscope 8, pitch monitor 10 and pitch generator 22 to the input of pitch amplifier 21. Similarly, the output from tangent potentiometer 62, the input of which is connected across the output of pitch feedback generator 22, is applied in series with the outputs from yaw gyroscope 1, tangent potentiometer 24, side-slip detector 25 and yaw generator 22 to the input of yaw amplifier 21.

The signals fed into the yaw and pitch circuits from the tangent potentiometers 62, 61 are respectively ($-\tan \phi$) (pitch generator signal) and ($\tan \phi$) (yaw generator signal), the correct sign being obtained by suitable connections. The elevators and rudder are therefore controlled in accordance with the quantities:

$$\cos \phi \ (b \cos \phi + c \sin \phi)$$

and $$\cos \phi \ (c \cos \phi - b \sin \phi)$$

respectively i. e., in accordance with the signals proportional to the rate of turn of the craft about the aircraft pitch axis and the deviation of the rate of turn of the craft about the aircraft yaw axis from a desired value respectively.

Before considering Figures 9 and 10 which illustrate more complicated forms of the system shown in Figure 8, consideration will be given to Figure 11 which shows the control circuit for one of the control surfaces of the aircraft similar to that used in these figures.

The rate of turn gyroscope, which is shown in Figures 11 and 13, is identical with those previously described with reference to Figure 4, except in that it is under no mechanical restraint about its gimbal axis. The gyroscope comprises a rotor 34 rotated at constant speed about an axis 35 which is journalled in a frame 36. This frame is rotatable about an axis 37 journalled in the aircraft, axis 37 being at right angles to the spin axis 35 of the gyroscope. Rotation of the frame 36 is resisted by means of torque motors, shown diagrammatically at 64 and 65. If rotation of the frame 36 about axis 37 relative to the aircraft is prevented and the aircraft rotates about an axis normal to the plane of axes 35, 37, the torque exerted about the axis 37 is well known to be proportional to the rate of rotation of the aircraft. This torque is resisted by the torque motors 64, 65, frame 36 being otherwise free to rotate about the axis 37. Rotation of frame 36 relative to the aircraft causes motion of an electrical pick-off device shown symbolically in Figure 13 where a conducting arm 39 attached or geared to frame 36 is shown sweeping over an arcuate resistance 40 connected to the source of alternating current 43. The output from the device appears between the tapping point 42 of the resistance 40 and the conducting arm 39. The device is shown generally at 40 in Figure 11, the same numeral representing the resistance and the device as a whole.

The conducting arm 39 of the potentiometer 40 is connected through center tap 42 to the input of the amplifier 21, the output from which is applied to the servomotor 19 for the control surface as in Figure 1. The servomotor 19 also drives the generator 22 which is of the same type as previously described, i. e. it gives an output in accordance with the speed of the motor 19. This generator output is applied to one winding of the two phase torque motor 64. The conducting arm 39 of the potentiometer is also connected to the input of an amplifier 63 which produces an output approximately proportional to the differential with respect to time of the input thereto. Thus, the amplifier may consist of a conventional amplifier together with a demodulator, an electronic differentiating circuit such as a resistance and condenser in series and a remodulator connected in cascade. Such an amplifier gives an output substantially proportional to the product of $$\frac{D}{1+\tau D}$$

and the input where D is the operator of differentiation with respect to time and $\tau$ is a constant depending upon the amplifier. The output from amplifier 63 is applied to one phase of two phase torque motor 65. The other phases of motors 64, 65 are supplied with the output from source 20, this output being in quadrature with the signal from amplifier 63 and generator 22. Motors 64, 65 (and motors 66, 67 of Figure 9) exert a torque substantially proportional to the signals applied to their signal windings. For a fuller description of amplifier 63 and its connection, reference is made to "Theory of Servo-Mechanisms" by James et. al., McGraw-Hill, 1947, pages 108 to 130, and in particular Figure 3.25 on page 126.

If the aircraft is rotated about the axis normal to axes 35, 37 frame 36 will precess about axis 37, producing a signal from the potentiometer 40. This precession is opposed by the torque of motor 64 which torque is proportional to the rate of rotation of motor 19. An equilibrium position will be reached when 36 is stationary relative to the aircraft, when the rate of rotation of servomotor 19 will be equal to the rate of turn of the aircraft. The torque motor 65 is provided to increase the stability of the system. When the signal from the pick-off device 40 is changing, motor 65 applies a torque tending to oppose changes in the gyroscopic torque.

It will be appreciated that it is an advantage of the invention that the system described with reference to Figure 11 is not subject to zero errors in the components caused, for example by amplifier 21 having a non-zero output for zero input, or by pick-off device 40 having a zero error; since, if such a zero error exists in the system, the equilibrium position of the gyroscope for zero rate of turn will be that in which the slider arm 39 is displaced from the center tap 42 by a sufficient extent to counter the error as explained in detail in U. S. Patent No. 2,650,-338.

Although for greater clarity two torque motors 64, 65 are shown in Figure 11 acting on the gimbal frame 36 of the gyroscope, it will be readily understood that it will be more convenient to employ one torque motor only and to apply the signals from device 63 and generator 22 in series to its signal winding.

In Figure 9, the control of the rudder and elevator servomotors 19 is as shown in Figure 11, rate of yaw and rate of pitch gyroscopes 1 and 8 being of the form shown in Figure 13. The gyroscopes 1 and 8 and pitch monitor 10 as well as the rate of roll gyroscope (not shown in Figure 9) for the control of the ailerons are mounted on the platform 11, as in the system described with reference to Figure 1. The output from yaw feedback generator 22 is in this case connected to one winding of torque motor 64 and the other ends of the signal winding of yaw torque motors 64, 65 are connected to earth through resistance 73. Similarly, the output from pitch feedback generator 22 is applied to the signal winding of pitch torque motor 64, pitch torque motors 64, 65 having the other ends of their signal windings connected to earth through the resistance 72.

The voltage generated across resistance 73 is amplified in amplifier 70, the output of which is connected across the potentiometer resistance of the tangent potentiometer 68 similar to those previously described with reference to Figure 13. The output from potentiometer 68 controls a third torque motor 66 on the same shaft of pitch gyroscope 8 as the motors 64, 65. Similarly, the voltage generated across resistance 72 is amplified in amplifier 71 and applied through tangent potentiometer 69 to the third torque motor 66 on the shaft of yaw gyroscope 1. On the shaft of this gyroscope is a fourth torque motor 67, to the signal winding of which is applied the output of the tangent potentiometer 24, previously described.

The operation of the circuit is as follows: Suppose the aircraft is banked in the manner described with reference to Figure 1 by rotating the platform 11 relative to the aircraft through an angle $\phi$ about the roll axis. A signal proportional to tan $\phi$ is then generated by potentiometer 24 causing torque motor 67 to exert a proportional torque on yaw gyroscope 1. This results in the aircraft turning in azimuth at a rate proportional to the tangent of the angle of bank, since if it did not do so the precessional torque of the gyroscope 1 would not totally offset the torque of motor 67 and the slider arm 39 of pick-off device 40 would be displaced from its center tapping 42 and the rudder 2 and elevators 6 would be actuated to change the rate of turning in azimuth until the two torques were equal.

The stabilization of the aircraft to maintain the aircraft in a predetermined attitude about the gravity pitch axis and to maintain the aircraft turning in azimuth at the correct rate for the angle of bank and the cruising speed of the aircraft is similar to that of the system shown in Figure 8. When the aircraft speed varies from the cruising speed, the side-slip detector 25 will emit a signal to alter the rate of turning in azimuth to prevent side-slipping, as before.

As in that shown in Figure 8, the embodiment shown in Figure 9 is A. C. operated, i. e. the motors are electric A. C. motors and the signals emitted by tangent potentiometer 24, side-slip pendulum 25, pitch monitor 10 and the pick-off devices 40 of the yaw and pitch gyroscopes 1 and 8 are A. C. signals. Figure 10 illustrates the D. C. version of the system illustrated in Figure 9. In this case, the motors 19, 64, 65, 66 and 67 are D. C. motors and the generators 22 are D. C. generators. Sources of D. C. energy instead of the source 43 are applied across the resistance of the potentiometers associated with gyroscopes 1 and 8 and with side-slip detector 25, pitch monitor 10 and tangent potentiometer 24. The amplifiers 63 are replaced in the case of the yaw circuit, by the series connected resistance 75 and condenser 74 and, in the case of the pitch circuit, by the series connected resistance 77 and condenser 76. Chokes 78, 79 are inserted in the leads between the amplifiers 68, 69 and the torque motors 66 respectively to inhibit any tendency to high frequency instability.

In the systems of Figures 9 and 10, it will be appreciated that yaw torque motors 64, 65, 66 and 67 may be more conveniently replaced by a single yaw torque motor, to the signal winding of which are applied in series the various signals applied to motors 64, 65, 66, 67. The figures show four motors for the sake of greater clarity. Similarly, pitch torque motors 64, 65 and 66 may be conveniently replaced by a single pitch torque motor.

In Figure 8, the compass monitor has not been shown. This component is, however, similar to that shown in Figure 7 and is connected with its output in series with that of the rate of yaw gyroscope 1 as is Figure 1. In Figures 9 and 10, the compass monitor 3 is again not shown. In these cases its output is applied in series with those of side-slip pendulum 25 and yaw feedback generator 22 to the signal winding of yaw torque motor 64. The monitor 3 is cut out of action during a banked turn, i. e. when platform 11 is rotated in roll relative to the aircraft as described previously.

The above disclosures and the drawings are intended to be illustrative of certain forms the invention may take and are not to be construed as limiting. The patent is intended to cover the invention as set forth in generic terms of the claims appended hereto. It is the generic terminology of the claims which is intended to delimit the invention and to cover those variations in structure and operation which will be suggested by the present disclosure to those skilled in the art.

I claim:

1. An automatic control system for aircraft comprising bank setting means, means for detecting a rate signal representing the difference between the actual rate of turn of the aircraft about the gravity yaw axis and the predetermined rate of turn and means for controlling the rudder and elevators simultaneously in accordance with the angle of bank and the detected signal said control means having vector resolution means for obtaining further signals proportional to the components about selected aircraft axes of the detected signal said further signals respectively controlling the actuation of the rudder and elevators whereby the rate of turn of the aircraft about the gravity yaw axis is maintained substantially at a predetermined value.

2. An automatic control system for aircraft comprising bank-setting means, a resolver actuated by said bank-setting means, means for detecting a rate signal representing the difference between the actual rate of turn of the aircraft about the gravity yaw axis and the predetermined rate of turn and connected to supply a signal representing said rate as an input to said resolver, said resolver producing outputs consisting of component values of said detected signal about the aircraft yaw and pitch axes respectively, and means connected for controlling the rudder in accordance with the component about the aircraft yaw axis of the detected signal and means for simultaneously controlling the elevators in accordance with the component about the aircraft pitch axis, both said means for controlling being connected to said resolver whereby the rate of turn of the aircraft about the gravity yaw axis is maintained substantially at the predetermined value.

3. An automatic control system for aircraft comprising bank-setting means, means for detecting a rate signal representing the difference between the actual rate of turn of the aircraft about the gravity yaw axis and the predetermined rate of turn, means for detecting rate of turn of the aircraft about the gravity pitch axis and means responsive to said detecting means for controlling the rudder in accordance with the angle of bank, the detected rate of turn signal and the detected rate of turn about the gravity pitch axis and means having vector resolution means for obtaining components of said detected rates about the aircraft axes and connected to said detecting means for controlling the elevators in accordance with the angle of bank, the detected signal about the gravity yaw axis and the detected rate of turn about the gravity pitch axes whereby the rate of turn of the aircraft about the gravity yaw axis is maintained substantially at the predetermined value.

4. An automatic control system for aircraft comprising bank-setting means, means for detecting a rate signal representing the difference between the actual rate of turn of the aircraft about the gravity yaw axis and the predetermined rate of turn, means for detecting the rate of turn of the aircraft about the gravity pitch axis, means responsive to said detecting means for controlling the rudder in accordance with the components about the aircraft yaw axis of the detected signal about the gravity yaw axis and the detected rate of turn about the gravity pitch axis and means connected to said detecting means and having vector resolution means for obtaining components of said detected rates about the aircraft axes for controlling the elevators in accordance with the angle of bank, the detected rate signal about the gravity yaw axis and the detected rate of turn about the gravity pitch axis.

5. An automatic control system as claimed in claim 4, in which the elevators and rudder are controlled at least in part by said resolvers as part of said control means which are constructed to determine the quantities $(c \sin \varphi + b \cos \varphi)$ and $(c \cos \varphi - b \sin \varphi)$ respectively, where $b$ is the detected rate of turn about the gravity pitch axis $c$ is the detected rate of turn signal about the gravity yaw axis, and $\varphi$ is the angle of bank of the aircraft.

6. An automatic control system as claimed in claim 5, a pitch monitor detecting deviation of the aircraft from the level about the gravity pitch axis, and means for controlling the rudder and elevators simultaneously in accordance with the angle of bank and the detected deviation about the gravity pitch axis to maintain the aircraft level in pitch.

7. An automatic control system as claimed in claim 6 in which the predetermined value for the rate of turn of the aircraft about the gravity pitch axis is that value for which the aircraft turns without side slipping for the angle of bank of the aircraft and the normal cruising speed of the aircraft and means detecting lateral acceleration of the aircraft connected to correct for side slipping with respect to said predetermined value.

8. An automatic control system for aircraft comprising bank setting means, means for detecting a rate signal representing the difference between the actual rate of turn of the aircraft about the gravity yaw axis and the predetermined rate of turn, a rate of pitch device generating a rate of pitch signal in accordance with the rate of turn of the aircraft about the gravity pitch axis, means to generate from said rate of turn signal a signal in accordance with the detected rate of turn of the aircraft about the yaw axis from a predetermined value, first and second resolvers each constructed and connected for generating two outputs sensibly proportional to the product of the signal applied to the input thereof and the sine and cosine of the angle of bank of the aircraft respectively, means for applying said detected signal to the input of said first resolver, means for applying said rate of pitch signal to the input of said second resolver and means for controlling the rudder and elevators by the outputs from said resolvers respectively in accordance with the quantities $(c \cos \varphi - b \sin \varphi)$ and $$(c \sin \varphi + b \cos \varphi)$$

where $b$ is the rate of turn of the aircraft about the gravity pitch axis, $c$ is the said detected rate of turn of the aircraft about the gravity yaw axis and $\varphi$ is the angle of bank.

9. An automatic control system as claimed in claim 8 in which said bank setting means comprises a platform which is rotatable about an axis parallel to the aircraft roll axis, means for causing the aircraft to bank in the opposite direction and through an equal angle to that through which the platform is turned from a predetermined position in the aircraft, whereby the said platform is maintained in a level position in space about the roll axis and means for operating said bank-setting means by the rotation of said platform from said predetermined position.

10. An automatic control system as claimed in claim 9 in which the rate of turn and rate of pitch devices are mounted on said platform and said means for causing the aircraft to bank comprises a rate of roll device responsive to rate of roll about the roll axis mounted on said platform and means for actuating the ailerons in accordance with the detected rate of roll in the opposite direction to the detected turn.

11. An automatic control system as claimed in claim 10 in which the signals generated by the said rate of turn device and rate of pitch device are A. C. signals and in which each resolver comprises a rotor winding to which is applied the electrical input, two output stator windings mutually at right angles and a coupling between said rotor and said platform whereby the angle said rotor makes with said windings are $\varphi$ and $(90° - \varphi)$ respectively where $\varphi$ is the angle of bank.

12. An automatic control system as claimed in claim 11 wherein the means for generating the detected rate signal comprise means for generating an electric A. C. course changing signal proportional to the tangent of the angle through which said platform is rotated from said predetermined position in the aircraft and means for applying said course changing signal in series opposition with the rate of turn signal to the input of the resolving means associated with the rate of turn device, whereby the aircraft is caused to turn in azimuth at the predetermined rate when the rate of turn signal and the bank-setting signals are substantially equal and opposite, the resultant signal applied to the input of the yaw resolving means being said detected signal generated by said rate of yaw device.

13. An automatic control system as claimed in claim 12 in which said course changing means operated by said bank setting means and the ratio between the amplitude of the course changing signal and the tangent of the angle of bank is such that the aircraft turns at the predetermined rate about the gravity pitch axis without side-slipping for the angle of bank of the aircraft and the cruising speed of the aircraft.

14. An automatic control system for aircraft comprising bank-setting means, a rate of yaw device generating an A. C. signal in accordance with the deviation from a predetermined value of the rate of turn about the gravity yaw axis, a rate of pitch device generating an A. C. signal in accordance with the rate of pitch of the aircraft about the gravity pitch axis, a first and second resolving means each for generating two outputs sensibly proportional to the product of the A. C. signal applied to the input thereof and the sine and cosine of the angle of bank of the aircraft respectively, means for applying the A. C. signal from the rate of yaw device to the input of said first resolving means, means for applying the A. C. signal from the rate of pitch device to the input of said second resolving means, means for combining the outputs from said resolving means to form A. C. elevator and rudder controlling signals sensibly proportional to quantities $(c \sin \varphi + b \cos \varphi)$ and $(c \cos \varphi - b \sin \varphi)$ respectively, where $b$ is the detected rate of turn about the gravity pitch axis, $c$ is the deviation from the predetermined value of the rate of turn of the aircraft about the gravity yaw axis, and $\varphi$ is the angle of bank of the aircraft, electric elevator and rudder servomotors controlling the elevators and rudder respectively, the speeds of said elevator and rudder servomotor being controlled by said elevator and rudder controlling signals respectively.

15. An automatic control system for aircraft comprising bank setting means, means for detecting the deviation from a predetermined value of the rate of turn of the aircraft about the gravity yaw axis, means for controlling the rudder and elevators simultaneously in accordance with the angle of bank and detected rate of turn about the gravity yaw axis said control means having vector resolution means for obtaining components of said detected deviation about the corresponding aircraft axis and means connected to said control means for ensuring that the ratio of the rudder and elevator movements effected during a banked turn of the aircraft in azimuth is substantially in accordance with the tangent of the angle of bank.

16. An instrument support or the like for aircraft having controlling surfaces comprising, in combination, a platform, means carried by said aircraft and tiltably supporting said platform about an axis of said aircraft, a rate of turn instrument carried by said aircraft and adapted to produce a signal having a characteristic proportional to the rate of turn of said rate of turn instrument about said axis, means to rotate said instrument bodily to produce a change in attitude and resolving means connected to receive said signal and produce vector signal components thereof about a plurality of axes of the aircraft, operating means for said control surfaces to control the craft about said axis, and means for applying said signal components to said operating means to cause the craft to assume a position which will bring said platform to a predetermined position, such as a horizontal position.

17. An arrangement as claimed in claim 16 in which the rate of turn instrument is mounted on the said platform and means to inject a fixed predetermined signal into the combination forming part of said means to rotate said instrument bodily.

18. In an automatic control system for an aircraft having a rate of roll device controlling the ailerons and a rate of yaw device controlling the rudder; the combination of a platform tiltable about an axis parallel to the roll axis and carrying the rate of roll device, means for tilting the platform from a datum position in the aircraft, the rate of roll device controlling the ailerons to maintain the platform level with reference to gravity axes means controlled by relative tilt of the platform and aircraft to give an output in accordance with the tangent of the angle of tilt of the platform and connected with the output of the rate of yaw device to give therewith a signal proportional to the discrepancy between the rate of turn appropriate to an angle of bank equal but opposite to the angle of tilt of the platform and the actual rate of turn of the craft and a servomotor controlled by said signal to control the rudder to cause the aircraft to change its course at a rate which is directly proportional to the tangent of the angle of tilt of the platform from its datum position.

19. An automatic control system for aircraft comprising bank setting means, said bank setting means being adapted to apply a selected angle of bank to the aircraft, a rate of turn device giving a signal in accordance with the rate of turn of the aircraft about the gravity yaw axis, resolving means connected to receive said signal and produce vector signal components thereof about a plurality of axes of the aircraft, a signal generator, said signal generator being actuated by the aforesaid bank setting means and giving a signal equal and opposite to that from the rate of turn device when the aircraft is turning about the gravity yaw axis at a rate appropriate to the selected angle of bank and the then existing air speed, and a servomotor system actuating the rudder and elevators of the craft in accordance with the difference between the resolved signals from the rate of turn device and the signal generator to cause the aircraft to turn about the gravity yaw axis at the rate appropriate to the selected angle of bank at the existing air speed.

20. An automatic stabilizer for aircraft comprising bank setting means, said bank setting means being adapted to apply a selected angle of bank to the aircraft, a rate of turn device adapted to give a response in accordance with the difference between the rate of turn of the aircraft about the gravity yaw axis and the desired rate of turn of the aircraft about the gravity yaw axis appropriate to the selected angle of bank and the then existing air speed, resolving means connected to give vector components of said response about a plurality of axes of said aircraft and a servomotor system actuating the rudder and elevators in accordance with said response components and the selected angle of bank to cause the aircraft to turn about the gravity yaw axis at the rate appropriate to the selected angle of bank at the existing air speed.

21. An automatic control system as claimed in claim 20 wherein the said response is a signal in accordance with the difference between the rate of turn of the aircraft about the gravity yaw axis appropriate to the selected angle of bank and the then existing air speed and the actual rate of turn of the aircraft about the gravity yaw axis.

22. An automatic control system as claimed in claim 21 wherein the said resolving means comprises a resolver actuated by the bank setting means, the signal being applied as an input to said resolver and said resolver providing a first output proportional to signal times cosine angle of bank and a second output proportional to signal times sine angle of bank, a rudder servomotor arranged to rotate at a speed proportional to the first output and an elevator servomotor arranged to rotate at a speed proportional to the second signal.

23. An automatic control system as claimed in claim 22 comprising first and second tachometric generators respectively driven by the rudder and elevator servomotors a first amplifier to whose input are applied in opposition the first output signal and the signal from the first tachometric signal generator and a second amplifier to whose input are applied in opposition the second output signal and the signal from the second tachometric generator, the outputs from said first and second amplifiers controlling respectively the rudder and elevator servomotors whereby the rudder is driven at a speed proportional to the first output signal and the elevator is driven at a speed proportional to the second output signal.

24. An automatic control system for aircraft comprising bank setting means, said bank setting means being adapted to apply a selected angle of bank to the aircraft, a rate of turn device adapted to give a signal in accordance with the difference between the rate of turn of the aircraft about the gravity yaw axis and the desired rate of turn of the aircraft about the gravity yaw axis appropriate to the selected angle of bank and the existing air speed, a rudder servomotor, an elevator servomotor, means to actuate the rudder servomotor at a speed proportional to the product of the aforesaid signal and the cosine of the angle of bank and means to actuate the elevator servomotor at a speed proportional to the product of the aforesaid signal and the sine of the angle of bank to cause the aircraft to turn about the gravity yaw axis at the rate appropriate to the selected angle of bank at the said air speed.

25. An automatic control system for aircraft comprising bank setting means, said bank setting means being adapted to apply a selected angle of bank to the aircraft, a rate of yaw device adapted to give a "yaw" signal in accordance with the difference between the rate of turn of the aircraft about the gravity yaw axis and the desired rate of turn about the gravity yaw axis appropriate to the selected angle of bank and the then existing air speed, a rate of pitch device adapted to give a "pitch" signal in accordance with the rate of pitch of the aircraft about the gravity pitch axis, a rudder servomotor, an elevator servo motor, means to actuate the rudder servomotor at a speed proportional to "yaw" signal times cosine angle of bank minus "pitch" signal times sine angle of bank and means to actuate the elevator servomotor at a speed proportional to "yaw" signal times sine angle of bank plus "pitch" signal times cosine angle of bank.

26. The combination set forth in claim 25, wherein the response is a signal in accordance with the difference between the rate of turn of the aircraft about the gravity yaw axis appropriate to the selected angle of bank and the said air speed and the actual rate of turn of the craft about the gravity yaw axis.

27. An automatic control system for aircraft comprising bank setting means, means for detecting the deviation of the rate of turn of the aircraft about the gravity yaw axis from a predetermined value and means for controlling the rudder and elevators simultaneously in accordance with the angle of bank and detected deviation, said control means having cross-feed means connected to ensure that the ratio of elevator-to-rudder movements which are called into play to maintain the turn is substantially in accordance with the angle of bank.

28. The combination set forth in claim 27, means to adjust said ratio during flight comprising side-slip detector means to compensate for departures from a selected speed and connected to the rudder control portion of said means for controlling the rudder and elevators simultaneously.

29. An automatic control for aircraft comprising bank setting means, means for detecting a rate signal representing the difference between the actual rate of turn of the aircraft about the gravity yaw axis and the predetermined rate of turn, means for controlling the rudder and elevators simultaneously in accordance with the angle of bank and detected rate of turn about the gravity yaw axis, said control means having vector resolution means for obtaining components of the detected rate signal about the corresponding aircraft axis and means connected to said control means for ensuring that the ratio of the rudder and elevator movements effected during a banked turn of the aircraft in azimuth is substantially in accordance with the tangent of the angle of bank.

30. The combination set forth in claim 29, said last means comprising a tangent potentiometer.

No references cited.

UNITED STATES PATENT OFFICE

CERTIFICATE OF CORRECTION

Patent No. 2,801,816 August 6, 1957

Frederick William Meredith

It is hereby certified that error appears in the above numbered patent requiring correction and that the said Letters Patent should read as corrected below.

In the heading to the printed specification, line 8, for "October 10, 1947" read -- September 5, 1942 --.

Signed and sealed this 18th day of March 1958.

(SEAL)

Attest:

KARL H. AXLINE

Attesting Officer

ROBERT C. WATSON
Commissioner of Patents